UNITED STATES PATENT OFFICE.

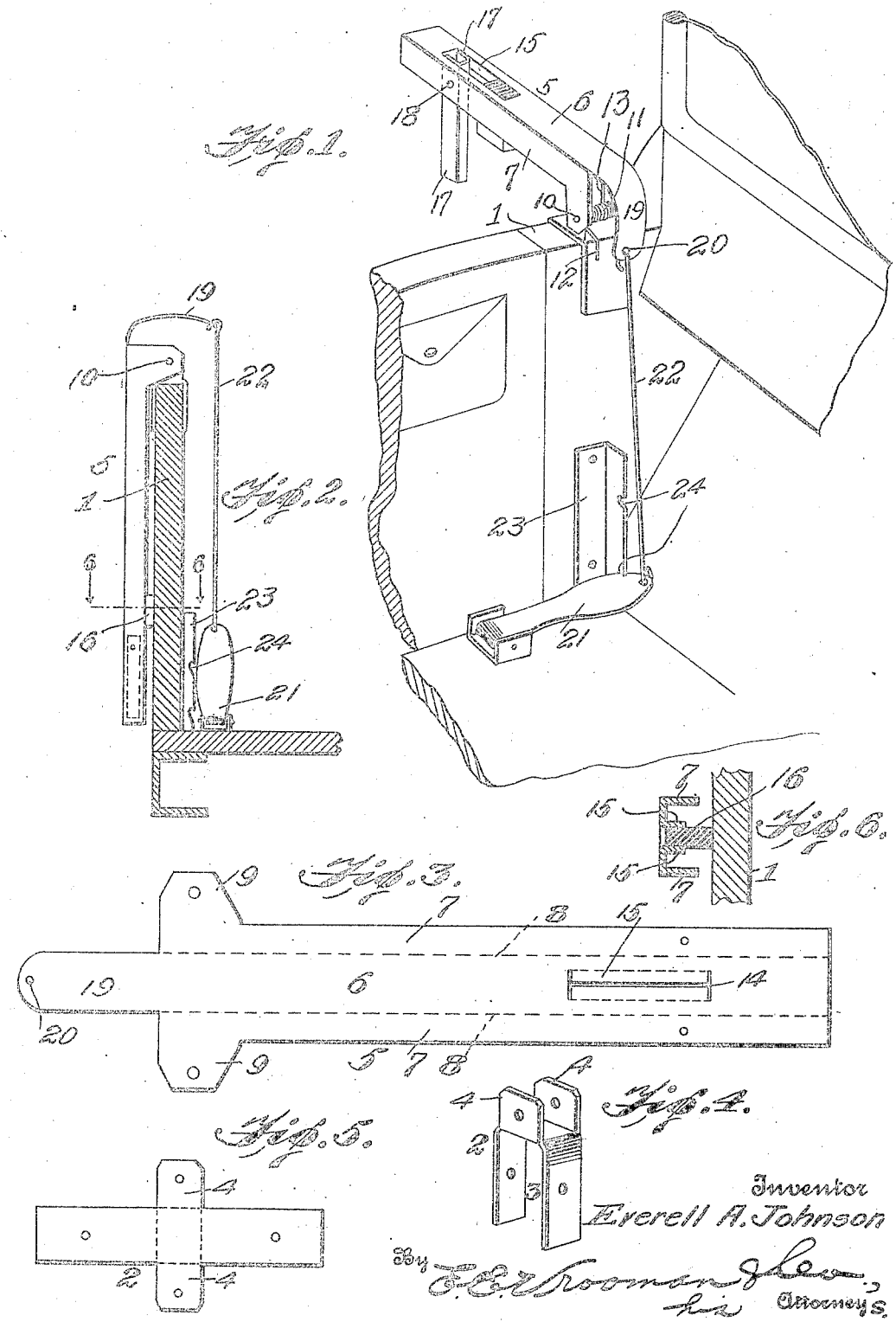

EVERELL A. JOHNSON, OF DANVERS, MONTANA.

TRAFFIC-SIGNAL.

1,326,512.   Specification of Letters Patent.   Patented Dec. 30, 1919.

Application filed August 22, 1919. Serial No. 319,213.

*To all whom it may concern:*

Be it known that I, EVERELL A. JOHNSON, a citizen of the United States, residing at Danvers, in the county of Fergus and State of Montana, have invented certain new and useful Improvements in Traffic-Signals, of which the following is a specification, reference being had therein to the accompanying drawings.

This invention relates to traffic signals, and has for its object the construction of a simple and efficient signal that is attached to a motor vehicle, and which can be operated by the foot of a chauffeur for indicating purposes.

With this and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a fragmentary view of a motor vehicle showing in perspective my device in a set position thereon.

Fig. 2 is a fragmentary, sectional view of a motor vehicle with my device applied thereto, in an unset or inactive position.

Fig. 3 is a plan view of the blank from which the signal arm is formed.

Fig. 4 is a perspective view of the bracket, while

Fig. 5 is a plan view of the blank from which the bracket is formed.

Fig. 6 is a sectional view taken on line 6—6, Fig. 2, looking in the direction of the arrows.

Referring to the drawings by numerals, 1 designates the side of the body of a motor vehicle, upon which is fastened the bracket 2. The bracket 2 is formed from a sheet of material and comprises a vertical, inverted U-shaped body 3, from the upper ends of which extend apertured lugs 4, 4, and these lugs constitute a U-shaped frame upon which is pivotally mounted the signal arm 5.

The signal arm 5 is formed from a blank, and can be manufactured at a comparatively small expense by reason of this arm, as well as the bracket 2, being stamped by automatic machinery. The arm 5 comprises an elongated body 6 provided with parallel sides 7 produced by folding the body along lines 8—8; integral with the sides 7, at their inner ends, are apertured ears 9, which ears 9 engage the lugs 4 and bracket 2, and the registering apertures and ears and lugs receive, at 10, a suitable fastening pin or means for pivotally mounting the signal arm upon the lugs, and on the pin 10 is positioned coil spring 11 that has an end 12 positioned against the body of the bracket 2, and the other end 13 (Fig. 1) bears against the signal arm, whereby the tendency of the spring is at all times to hold the same against the side 1, as shown clearly in Fig. 2. The body 6 is slitted at 14 (Fig. 3), and parallel depending lips 15 are formed by this slit, between which lips 15 is securely fastened a rubber bumper or stop 16 for preventing the arm from marring or injuring the finish of the side 1 of the motor vehicle. These parallel lips 15 also serve to guide the link or finger 17 which is pivotally mounted at 18 upon the arm between the lips 15. This link or finger 17 is preferably painted red as an indicator of danger when the arm is in a set position (Fig. 1); the finger will drop down, as shown, and indicate to the pedestrian or vehicles in the rear that the operator is about to turn the motor vehicle. The signal arm is provided with an integral, curved tail piece 19 that has an aperture near its outer end. This tail piece has a slight resilient action, but is strong enough to draw the arm to its set position (Fig. 1) when the operator presses on the foot pedal 21; the foothold and tail piece 19 are pivotally connected by rod 22. An angle plate 23 is secured to the inner face of the side of the motor vehicle, under the bracket 2, and this plate is provided with notches 24 for receiving the outer edge of the foot pedal 21, so that the signal can be locked in an adjusted position (Fig. 1).

The signal is normally in the position shown in Fig. 2, but upon pressure being applied to the foot pedal 21, the signal arm will be raised to a horizontal position (Fig. 1), and the foot pedal placed in the lower notch 24, retaining the signal in a set position, with the painted finger 17 in a vertical position, indicating the intention of the operator to turn the vehicle.

It will be understood that in the manufacture of my invention, certain minor changes or alterations may be desired, as shall appear to one skilled in the art to which this invention relates, and, therefore, I reserve the right to make such minor alterations or changes as shall fairly fall within the scope of the appended claims.

What I claim is:

1. In a device of the class described, the combination with a support, of a signal arm carried by said support, said signal arm provided at one end with an apertured tail piece, said signal arm provided with an indicating finger adapted to lie parallel with the signal arm when the signal arm is in an unset position, and adapted to be positioned at right angles to the signal arm when the signal arm is in a set position, and means connected to the tail piece for operating the signal arm.

2. In a signal device, the combination with a support, of a sheet metal signal arm carried by said support, said signal arm comprising a body provided with parallel sides, said sides provided at one end with depending apertured ears, said body provided at one end with a curved, resilient apertured tail piece and adjacent the other end with a slit having parallel lips, a yieldable bumper secured between said lips, a finger pivotally mounted upon the signal arm and having a portion positioned between the lips of the slit, and manually-operating means positioned in the aperture of the tail piece.

3. In a device of the class described, the combination with a support, of a bracket provided with parallel lugs mounted upon said support, a signal arm provided with parallel sides and said sides having parallel apertured ears at one end, said ears engaging said lugs of the bracket, means extending through the apertures of the ears and the lugs for pivotally mounting the signal arm upon the bracket, a spring between the bracket and the arm for normally holding the arm in an unset position, said arm provided with a slit intermediate its ends, a bumper and a signal finger mounted in said slit, and means connected to one end of the signal arm for moving the same from an unset position to a set position.

4. In a device of the class described, the combination with a support, of a signal arm provided with a yieldable tail piece mounted upon said support, an angle plate provided with notches secured to said support, a foot pedal pivotally mounted upon said support, said foot pedal adapted to engage and be fastened in said notches, and means pivotally connecting the foot pedal to the tail piece of the signal arm.

In testimony whereof I hereunto affix my signature.

EVERELL A. JOHNSON.